United States Patent
Bazzo et al.

(10) Patent No.: US 8,660,086 B2
(45) Date of Patent: Feb. 25, 2014

(54) METHOD AND APPARATUS FOR ADMISSION CONTROL AND FORCED HANDOVER IN A MULTI-LAYER NETWORK CONFIGURATION

(75) Inventors: Juliano Joao Bazzo, Amazonas (BR); Vicente Angelo de Sousa, Jr., Amazonas (BR)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 12/773,594

(22) Filed: May 4, 2010

(65) Prior Publication Data

US 2011/0274083 A1 Nov. 10, 2011

(51) Int. Cl.
*H04W 36/34* (2009.01)

(52) U.S. Cl.
USPC ........... 370/331; 370/332; 370/333; 455/436; 455/437

(58) Field of Classification Search
USPC .......... 370/331, 328; 455/436, 453, 425, 437, 455/450
See application file for complete search history.

(56) References Cited

U.S. PATENT DOCUMENTS

| | | | |
|---|---|---|---|
| 5,392,453 A * | 2/1995 | Gudmundson et al. | 455/444 |
| 6,081,713 A * | 6/2000 | Desgagne | 455/436 |
| 6,445,924 B1 * | 9/2002 | Rasanen | 455/437 |
| 6,954,643 B2 * | 10/2005 | Petrus | 455/437 |
| 7,389,111 B2 * | 6/2008 | Petrus | 455/436 |
| 7,933,248 B2 * | 4/2011 | Hong et al. | 370/332 |
| 8,194,611 B2 * | 6/2012 | Mansour et al. | 370/331 |
| 2005/0148318 A1 * | 7/2005 | Cheng | 455/405 |
| 2006/0111108 A1 * | 5/2006 | Newbury et al. | 455/436 |
| 2006/0166677 A1 * | 7/2006 | Derakshan et al. | 455/453 |
| 2007/0160007 A1 * | 7/2007 | Wang et al. | 370/331 |
| 2007/0206552 A1 * | 9/2007 | Yaqub et al. | 370/338 |
| 2007/0280161 A1 * | 12/2007 | Rudrapatna et al. | 370/331 |
| 2008/0020770 A1 * | 1/2008 | Hofmann | 455/438 |
| 2008/0232326 A1 * | 9/2008 | Lindoff et al. | 370/332 |
| 2010/0029279 A1 * | 2/2010 | Lee et al. | 455/436 |

* cited by examiner

*Primary Examiner* — Rasheed Gidado
(74) *Attorney, Agent, or Firm* — Squire Sanders (US) LLP (57) ABSTRACT

In accordance with an example embodiment of the present invention, a method comprises collecting measurements from each of a plurality of mobile stations in a serving layer upon deciding that the serving layer is overloaded; computing a cost function for each of the mobile stations based on the collected measurements; selecting at least one mobile station from the plurality of the mobile station in the serving layer based on the cost function for a forced handover from the serving layer to an under-loaded layer; and initiating the forced handover from the serving layer to the under-loaded layer via a signaling message to the selected at least one mobile station.

20 Claims, 4 Drawing Sheets

FIGURATIONS OF 1/3/1 AND 1/3/3

*FIG. 3A*

FIGURATIONS OF 1/3/1, 1/3/1, AND 1/3/3

METHOD AND APPARATUS FOR ADMISSION CONTROL AND FORCED HANDOVER IN A MULTI-LAYER NETWORK CONFIGURATION

TECHNICAL FIELD

The present application relates generally to a method and apparatus for admission control and forced handover in a multi-layer network configuration.

BACKGROUND

It is not uncommon that multiple wireless systems of different network technologies are deployed in a same geographic area. In such an environment, it is highly desirable for each system to provide seamless interoperability and application connectivity to other mobile networks and network technologies. The example of the different network technologies may include personal area network (PAN), local area network (LAN) and wide area network (WAN).

A wireless network may have multiple layers including inner layers and outer layers to accommodate different bandwidth and quality of service (QoS) needs. An inner layer may refer to a smaller coverage area and an outer layer to a larger coverage area. The term layer as used in the context of this disclosure refers to a coverage area under a given frequency bandwidth. Traditionally, an admission control is a decision that a wireless network makes on whether to admit a user into a network, based on its resource and other constraints. Handover is a process to hand over a user from one cell to a neighbor cell when the user moves away from the current serving cell and into the neighbor cell. In a multi-layer network configuration, the mobile station may be admitted into one layer and then handed over into a different layer.

SUMMARY

Various aspects of examples of the invention are set out in the claims.

According to a first aspect of the present invention, a method comprises collecting measurements from each of a plurality of mobile stations in a serving layer upon deciding that the serving layer is overloaded; computing a cost function for each of the mobile stations based on the collected measurements; selecting at least one mobile station from the plurality of the mobile station in the serving layer based on the cost function for a forced handover from the serving layer to an under-loaded layer; and initiating the forced handover from the serving layer to the under-loaded layer via a signaling message to the selected at least one mobile station.

According to a second aspect of the present invention, an apparatus comprises a measurement module configured to collect measurements from each of a plurality of mobile stations in a serving layer upon deciding that the serving layer is overloaded. The apparatus also comprises a forced handover module configured to compute a cost function for the mobile station based on the collected measurements; and select a mobile station from the plurality of the mobile station in the serving cell based on a cost function for a forced handover from the serving layer to an under-loaded layer; and initiate the forced handover from the serving layer to the under-loaded layer via a signaling message to the selected mobile station.

According to a third aspect of the present invention, an apparatus comprises at least one processor; and at least one memory including computer program code. The at least one memory and the computer program code are configured to, with the at least one processor, cause the apparatus to perform at least the following: collecting measurements from each of a plurality of mobile stations in a serving layer upon deciding that the serving layer is overloaded; computing a cost function for each of the mobile stations based on the collected measurements; selecting at least one mobile station from the plurality of the mobile station in the serving layer based on the cost function for a forced handover from the serving layer to an under-loaded layer; and initiating the forced handover from the serving layer to the under-loaded layer via a signaling message to the selected at least one mobile station.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

A coordinated user distribution among different layers in the context of multi-layer configuration with one or multiple network technologies deployed in the same area may improve overall system resource usage and quality of service for users. A low-complexity handover method for multi-layer network configuration that may be triggered at the admission phase of a mobile station is the focus of this disclosure.

An example embodiment of the present invention and its potential advantages are understood by referring to FIGS. 1 through 6 of the drawings.

Figure 1:
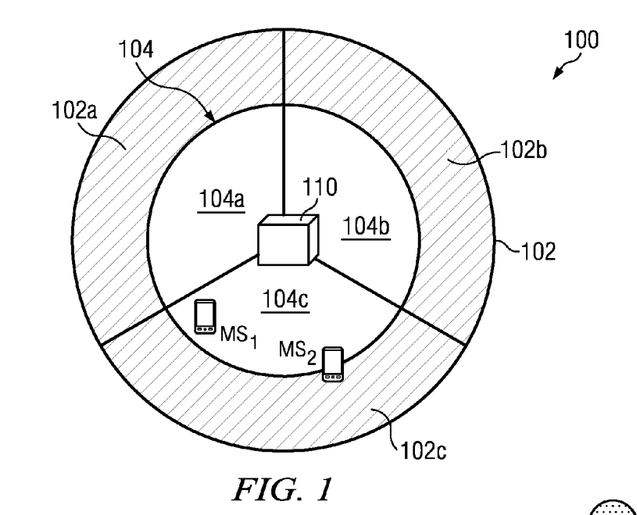
FIG. 1 illustrates an example wireless network with a forced handover capability in accordance with an example embodiment of the invention.

FIG. 1 illustrates an example wireless network 100 with a forced handover capability in accordance with an example embodiment of the invention. The network 100 includes a base station 110, a first mobile MS1, a second mobile station MS2, an inner layer 104 and an outer layer 102. The example base station 110 may be a long-term evolution (LTE) base station eNodeB, a generic fourth generation (4G) mobile station or a network management node. While the inner layer 104 includes three sectors, the sectors 104a, 104b and 104c, the outer layer 102 also includes three sectors, the sectors 102a, 102b and 102c. The inner layer 104 and the outer layer 102 may share the same frequency if the same technology such as LTE is deployed. In an alternative embodiment, the outer layer 102 and the inner layer 104 may have different frequency spectrums with different technologies such as LTE and Worldwide Interoperability for Microwave Access (WiMax) each deployed in one the two layers.

In one example embodiment, the mobile station MS1 first entered the cell or coverage area of the base station 110 and largely based on the QoS profile of the mobile station MS1, the base station 110 placed the mobile station MS1 in the sector 104c of the inner layer 104. The base station 110 may monitor the layer-wide system load on a continuing basis and when an overloading indication appears, an evaluation of a cost function for each mobile station in the serving layer 104 may be triggered. One example of the overloading indication is a crossing of a resource allocation threshold. The computed cost function may indicate a level of burden the mobile station puts on the serving layer. The cost function of MS1 and MS2 are computed and compared and it turns out that the mobile station MS2 has a higher cost function value on the inner layer 104. Then the base station 110 may initiate a forced handover process to handover the mobile station MS2 to the under-loaded neighboring layer 102.

Figure 2:
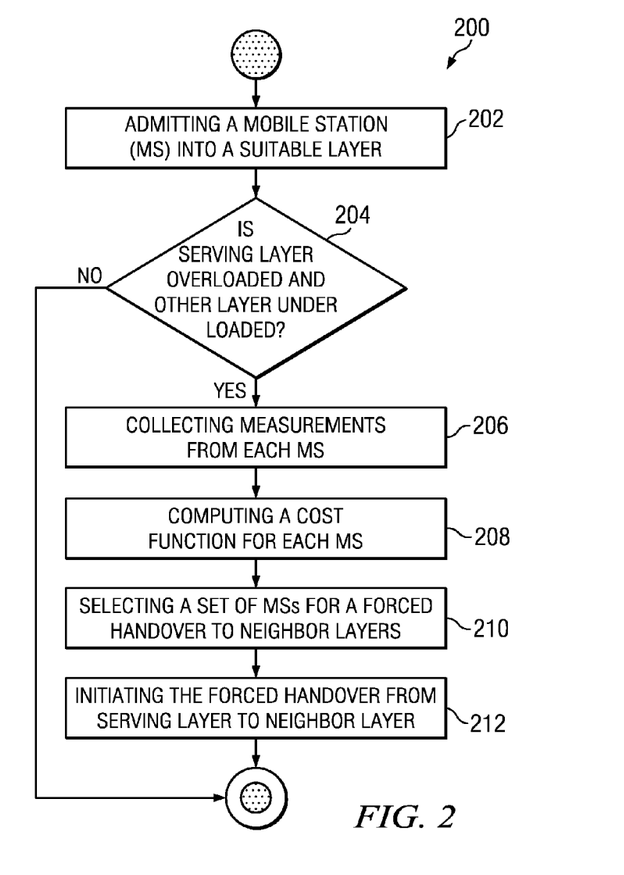
FIG. 2 illustrates an example method for a forced handover combined with admission control in accordance with an example embodiment of the invention.

FIG. 2 illustrates an example method 200 for a forced handover combined with admission control in accordance with an example embodiment of the invention. The method 200 may include admitting a mobile station into a suitable layer at block 202, determining whether the serving layer is overloaded at block 204, and entering a forced handover process if the serving layer is overloaded at block 206. On the other hand, if the serving layer is not overloaded, the method 200 terminates. The forced handover process of the method 200 may include collecting the measurements from each mobile station in the serving layer at block 206, and computing a cost function for each mobile station at block 208. The forced handover process of the method 200 also includes selecting at least one mobile station for forced handover at block 210 and initiating the forced handover at block 212.

In one example embodiment, admitting a mobile station into a suitable layer at block 202 may include admitting the mobile station into a suitable layer based on a QoS profile of the mobile station. As the mobile station roams into a cell, the base station may make an admission decision on whether to accept the mobile station and in which layer to place the mobile station in a multi-layer network configuration. In one example embodiment, the layer that may provide a better throughput would be selected as the suitable layer for the requested service, based on the QoS profile of the mobile station. For example, if the QoS profile of the mobile station indicates that the user primarily uses data services as opposed to voice or other services and an inner layer provides a coverage area of a local wireless network such as a WiFi network, then the WiFi network is usually better for data connection and the inner layer may be a suitable choice. The user QoS profile may be based on the user service history or a QoS request that the mobile station sends to the base station during the admission phase.

In one example embodiment, determining whether a layer is overloaded at block 204 may include collecting a plurality of loading measurements from the serving layer and one or more neighbor layers. The loading measurements may include at least current traffic loads, quality of service (QoS) profiles of the plurality of mobile stations at the serving layer, and available resources of the serving layer and the neighbor layers. Determining whether each layer is overloaded at block 204 may also include computing an overall layer-wide load based at least in part on the collected loading measurements for each layer. A plurality of criteria may be used to trigger the determining of whether the serving layer is overloaded and the criteria may be different from one technology to another technology. For example, for WiMAX networks, the overloading criterion may be based on the percentage of slots allocated and for LTE, the criterion may be the percentage of resource blocks allocated. One example of the overloading criteria is allocation of 80% of layer-wide resource. An underloading threshold may also be set such as the resource allocation being less than 60%, for example. In another embodiment, determining whether each layer is overloaded at block 204 may be scheduled at a fixed interval or on demand. Once it is determined the serving layer is overloaded and some neighbor layers are under-loaded, the method 200 may enter a forced handover process.

In one example embodiment, the forced handover process may start with collecting the measurements from each mobile station at block 206. Collecting the measurements may include collecting technology-specific or standard-specific measurements. For example, technology or standard specific measurements may include LTE-specific measurements and WiMax-specific measurements. Generally, measurements are defined by standards organizations such as The International Telecommunication Union (ITU), the 3rd Generation Partnership Project (3GPP) and The Institute of Electrical and Electronics Engineers (IEEE). Examples of such measurement are generally related to delay, information loss, data rate, among others.

Table 1 below lists some example measurements for 3GPP-based systems.

TABLE 1

Example measurements for 3GPP based system

| Measure | Type | Definition |
| --- | --- | --- |
| UTRA and GSM RSSI | UE measurement | Received Signal Strength Indicator (RSSI) is the received wide band power (within the relevant channel bandwidth), including thermal noise and noise generated in the receiver. |
| CPICH RSCP | UE measurement | Received Signal Code Power (RSCP) is the absolute power level of the Common Pilot CHannel (CPICH) as received by the UE (3GPP TS 25.133). |
| CPICH Ec/No | UE measurement | For Wideband Code Division Multiple Access (WCDMA), CPICH Ratio of energy per modulating bit to the noise spectral density (Ec/No) is the received energy per chip divided by the power density in the band (3GPP TS 25.133 and 25.215). If receiver diversity is not in use by the UE, the CPICH Ec/No is identical to CPICH RSCP/UTRA Carrier RSSI. |
| Transport channel BLER | UE measurement | Estimation of the transport channel block error rate (BLER). The BLER estimation shall be based on evaluating the CRC of each transport block associated with the measured transport channel after radio link combination. |

TABLE 1-continued

Example measurements for 3GPP based system

| Measure | Type | Definition |
|---|---|---|
| UE transmitted power Pathloss | UE measurement | The sum of the total UE transmitted power on all configured uplink carriers. The reference point for the UE transmitted power shall be the antenna connector of the UE (3GPP TS 25.215). This is the pathloss between the cell and UE. It is calculated by comparing the UE's measurement of CPICH RSCP and the value of Primary CPICH Tx Power (the power level of the CPICH at the cell, as reported by the cell). Pathloss (dB) = Primary CPICH Tx Power (dBm) − CPICH RSCP (dBm). See 3GPP TS 25.331. |
| E-UTRA RSRP | UE measurement | Reference signal received power (RSRP), is defined as the linear average over the power contributions (in [W]) of the resource elements that carry cell-specific reference signals within the considered measurement frequency bandwidth (3GPP TS 36.211 and 25.215). |
| E-UTRA RSRQ | UE measurement | Reference Signal Received Quality (RSRQ) is defined as the ratio N×RSRP/(E-UTRA carrier RSSI), where N is the number of resource blocks of the E-UTRA carrier RSSI measurement bandwidth. |
| E-UTRA RSSI | UE measurement | E-UTRA Carrier Received Signal Strength Indicator (RSSI) comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. |
| Received total wide band power | Network measurement | The received wide band power, including noise generated in the receiver, within the bandwidth defined by the receiver pulse shaping filter. The reference point for the measurement shall be the Rx antenna connector. |
| SIR | Network measurement | Signal to Interference Ratio (SIR), is defined as: (RSCP/ISCP)×SF. Where RSCP = Received Signal Code Power, unbiased measurement of the received power on one code. ISCP = Interference Signal Code Power, the interference on the received signal. SF = The spreading factor (SF) used on the DPCCH. |
| Transmitted carrier power | Network measurement | The ratio between the total transmitted power on one downlink (DL) carrier from one UTRAN access point, and the maximum transmission power possible to use on that DL carrier at this moment of time |
| Transport channel BER | Network measurement | The transport channel BER is an estimation of the average bit error rate (BER) of the DPDCH data of a Radio Link Set. |
| Physical channel BER | Network measurement | The Physical channel BER is an estimation of the average bit error rate (BER) on the DPCCH of a Radio Link Set. |
| Round trip time | Network measurement | Round trip time (RTT), is defined as RTT = $T_{RX} - T_{TX}$, where $T_{TX}$ = time of transmission of the beginning of a downlink DPCH or F-DPCH frame to a UE. The reference point for $T_{TX}$ shall be the Tx antenna connector. $T_{RX}$ = time of reception of the beginning (the first detected path, in time) of the corresponding uplink DPCCH frame from the UE. |
| DL Transmission Branch Load | Network measurement | The 'DL transmission branch load' is the maximum of the transmission branch loads calculated for each branch. A 'transmission branch load' is the ratio between the total transmitted power [W] on the considered branch and the 'maximum DL branch capability' on this branch. |
| QoS related measures | Other QoS related measures | QoS measure depends on the type of service provided. Generally, requirement was defined by ITU, 3GPP and IEEE recommendations. Examples of such measures are delay, information loss, data rate, among others. |

Table 2 below lists some example measurements for 802.16 IEEE-based systems.

TABLE 2

Example measurements for 802.16 IEEE-based systems

| Measure | Definition |
|---|---|
| Users/Frame | Number of active users in physical (UL or DL) frames. |
| Average Data Throughput for User | The ratio of the number of information bits that the user successfully received divided by the amount of the total observation time. |
| Average Per-User Data Throughput | The sum of the average data throughput of each user in the system, divided by the total number of users in the system. |

TABLE 2-continued

Example measurements for 802.16 IEEE-based systems

| Measure | Definition |
|---|---|
| Sector Data Throughput | The sum of the Average Data Throughput for all users assigned to the sector of interest. |
| Average Packet Call Throughput for User | Packet call throughput is the total bits per packet call divided by total packet call duration. |
| Packet Delay | The difference between packet arrival time at source station (either MS or BS) and its respective arrival time at destination (either MS or BS). |
| User Average Packet Delay | The average packet delay is defined as the average interval between packets originated at the source station (either MS or BS) and received at the destination station (either BS or MS) in a system for a given packet call duration. |
| Packet Loss Ratio | Defined as 1 − (Total number of successfully delivered packets)/(Total Number of Packets) where the total number of packets includes packets that were transmitted over the air interface and packets that were dropped prior to transmission. |
| System Data Throughput | The data throughput of a BS is defined as the number of information bits per second that a site can successfully deliver or receive via the air interface.. |
| QoS related measures | QoS measure depends on the type of service provided. |

In one example embodiment, computing a cost function for each mobile station at block 208 may include computing an overall cost C for each mobile station, where $$C = \sum_{i=1}^{n} w_i \cdot f_i(M_i),$$

$w_1 \ldots w_n$ are weights for measurements $M_1 \ldots M_n$ and the function $f_i(\ )$ is a normalization function that maps the measurement $M_i$ into a value between 0 and 1. Some example measurements $M_1 \ldots M_n$ are listed in Table 1 and table 2 above. The weights $w_1 \ldots w_n$ may be dynamically adjustable and vary from −1 to 1 or predetermined based at least in part on some operator policies or other criteria.

Table 3 below provides an example of some cost function parameters for forced handover algorithm from an outer layer to an inner layer.

TABLE 3

An example of cost function parameters for a forced handover algorithm from an outer to an inner layer

| Parameter | Measure of | Value | Comment |
|---|---|---|---|
| $w_1$ | — | 1 | 1 to give higher priority to best effort (BE) users. |
| $f(M_1)$ | Flow type | 0 or 1 | 0: for VoIP connections 1: for BE connections |
| $w_2$ | — | 0.1 | Lower value to give higher priority to Flow Type than radio condition. |
| $f(M_2)$ | SINR in dB | Any value between 0 and 1 | The SINR usually vary from −5 to 20 dB then, f(−5 dB) = 0; ... f(7.5 dB) = 0.5; ... f(20 dB) = 1; |

In one example embodiment, the weights $w_1$ and $w_2$ may be chosen according the significance levels of measurements $M_1$ and $M_2$. In the example of Table 3, $w_1$ is chosen to give higher priority to a best effort (BE) connection than a VoIP connection for the purpose of a forced handover. On the other hand, $w_2$ may be chosen to prioritize mobile stations (MSs) with better radio conditions which are may be located closer to the base station. To favor a forced handover from the inner layer to the outer handover, $w_1$ may be defined as −1 and $w_2$ as −0.1 to give priority of handover to a VoIP connection with a bad SINR condition that may be caused by the fact that the mobile station was located far away from the base station.

In one example embodiment, selecting at least one mobile station for forced handover at block 210 may include selecting one or more mobile stations with highest cost function values. The number of mobile stations selected for forced handover may depend on factors such as the severity level of overloading condition at the serving layer, desired performance and available resource level at the serving layer, resources available at the under-loaded layers, and the like.

In one example embodiment, initiating the forced handover at block 212 may include sending a signaling message to the selected mobile station for forced handover. Example of the signaling message and protocol may include LTE handover signaling protocol. Initiating the forced handover at block 212 may also include other tasks such as updating local data store to reflect updated configuration of mobile stations and available resource at the serving layer and the target layer of the forced handover.

Figure 6:
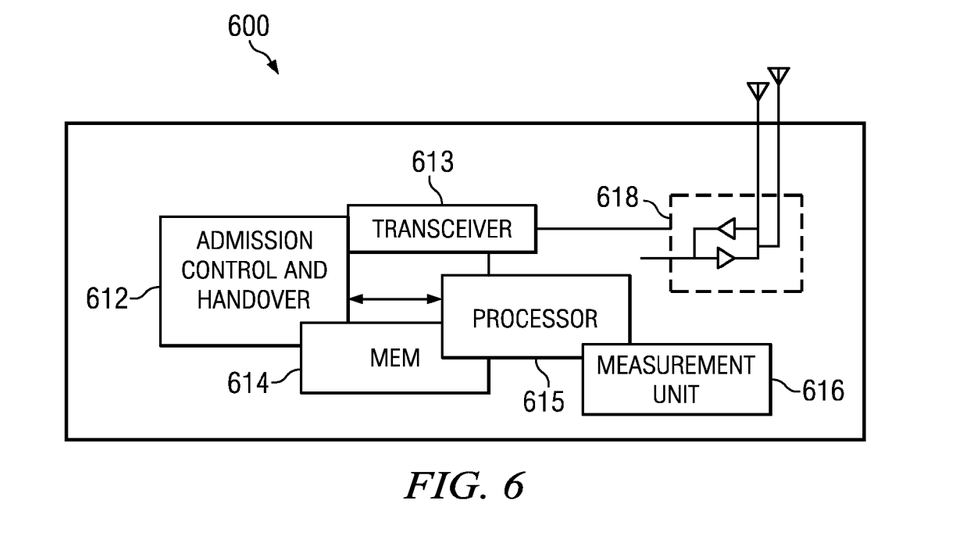
FIG. 6 illustrates an example wireless apparatus in accordance with an example embodiment of the invention.

In one example embodiment, the method 200 may be implemented at the base station 110 of FIG. 1 or at the apparatus 600 of FIG. 6. The method 200 is for illustration only and the steps of the method 200 may be combined, divided, or executed in a different order than illustrated, without departing from the scope of the invention of this example embodiment.

Figure 3A:
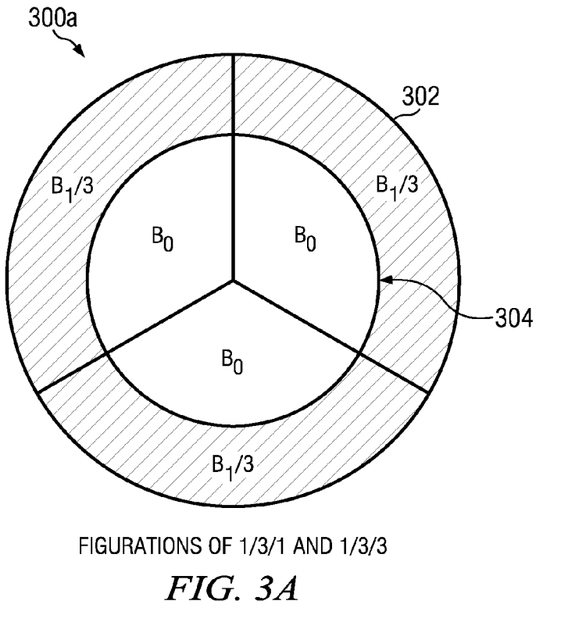
FIG. 3 illustrates two example wireless networks with multiple layers in accordance with an example embodiment of the invention.
Figure 3B:
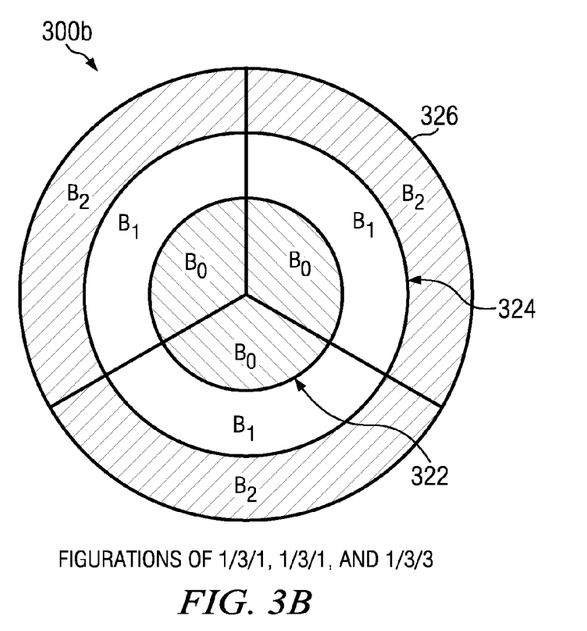

FIG. 3 illustrates two example wireless networks 300a and 300b with different layer configurations for forced handover. The network 300a illustrates a two-layer configuration where the method 200 may be applied. The configuration 300a includes an inner layer 304 and an outer layer 302 with two different bandwidth allocations. While the three sectors within the inner layer 304 share one layer-wide bandwidth $B_0$, the outer layer 302 has a configuration where the total bandwidth is divided into three parts, one for each of the three sectors within the outer layer 302. The notation $B_0$ 1/3/1 may be used to represent a layer with a single cell, 3 sectors and one total system spectrum $B_0$ applied to each sector. For example, for a layer configuration of 1/3/1 and the total system bandwidth of 10 MHz, each sector would be configured to work with the same 10 MHz bandwidth. Similarly, the notation $B_1$ 1/3/3 may represent a layer with 3 sectors and one-third of the total system spectrum $B_1$ applied to each of the 3 sectors. Therefore, the bandwidth per sector for the configuration of 1/3/3 is three times smaller than the configuration of 1/3/1. The configuration of 1/3/1 may provide a higher sector throughput with the cost of a higher interference and may result in a smaller coverage. On the other hand, the configuration of 1/3/3 may provide a smaller sector throughput, but with a smaller interference and a better-quality coverage. The wireless network configuration 300a may be a common network configuration for an operator to explore the benefits of a multi-layer configuration. This configuration may allow the operator to split the available bandwidth in two portions, applying the configuration of 1/3/1 to an inner layer and the configuration of 1/3/3 to an outer layer. The inner layer provides a smaller circle and small coverage area with a better quality of service while the outer provides a larger coverage area.

In one example embodiment, the wireless network 300b illustrates a three-layer configuration where the method 200 of FIG. 2 may be applied. The configuration 300b includes the inner layer 322, the middle layer 324 and the outer layer 326. The inner layer 322 has the configuration of $B_0$ 1/3/1 indicating that the layer 322 has a single cell with 3 sectors and one total system spectrum $B_0$ applied to all sectors. The middle layer 324 has a similar configuration of $B_1$ 1/3/1 indicating that the layer 324 has a single cell with 3 sectors and one total system spectrum $B_1$ applied to all sectors. The outer layer has the configuration of B2 1/3/3 indicating that the layer 326 has a single cell with 3 sectors and one-third of the total system spectrum B2 applied to each sector.

Figure 4:
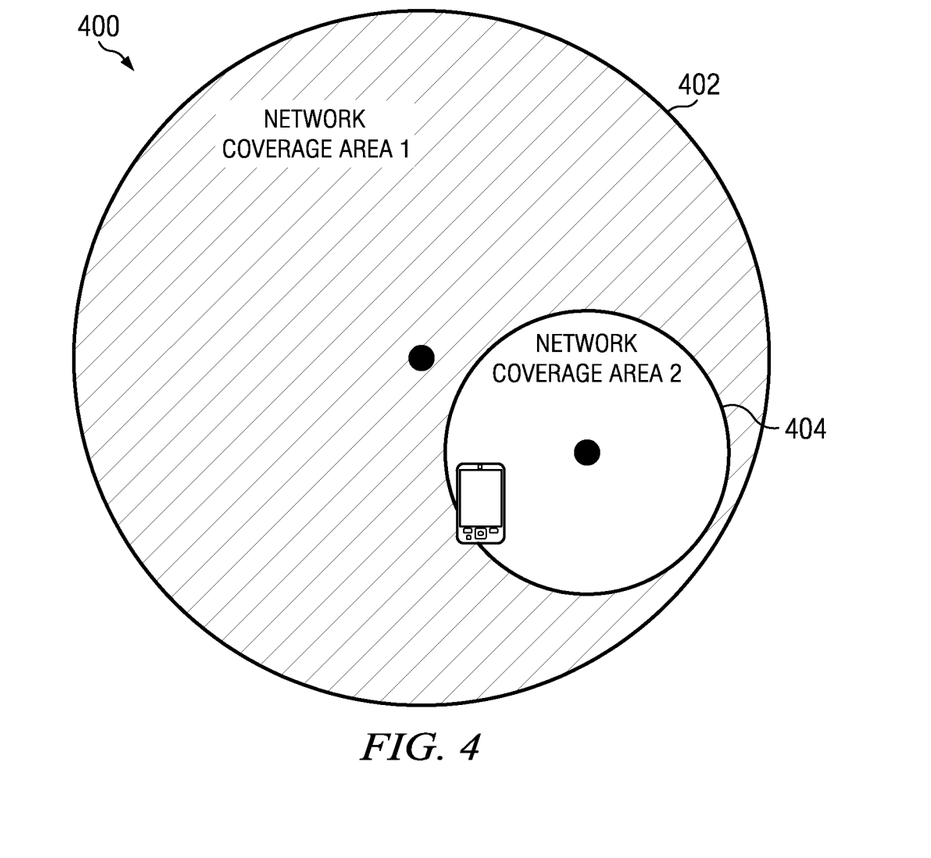
FIG. 4 illustrates an example multi-layer configuration with different network technologies in accordance with an example embodiment of the invention.

FIG. 4 illustrates an example multi-layer configuration 400 that may support different network technologies in accordance with an example embodiment of the invention. The network scenario 400 includes a first coverage area 402 with one network technology and second coverage area 404 with a different network technology. The first coverage area 402 overlaps the second coverage area 404. The multi-layer configuration 400 shows a common deployment scenario for locations such as mall centers, airports or other high-population-density areas. In one example embodiment, the first coverage area 402 may be a 3G network coverage area while the second coverage area 404 may be a wireless local area network such as a WiFi network coverage area. The method 200 of FIG. 2 may be applied to the multi-layer configuration 400 in a similar manner as it may be applied to the wireless networks 300a and 300b.

Figure 5:
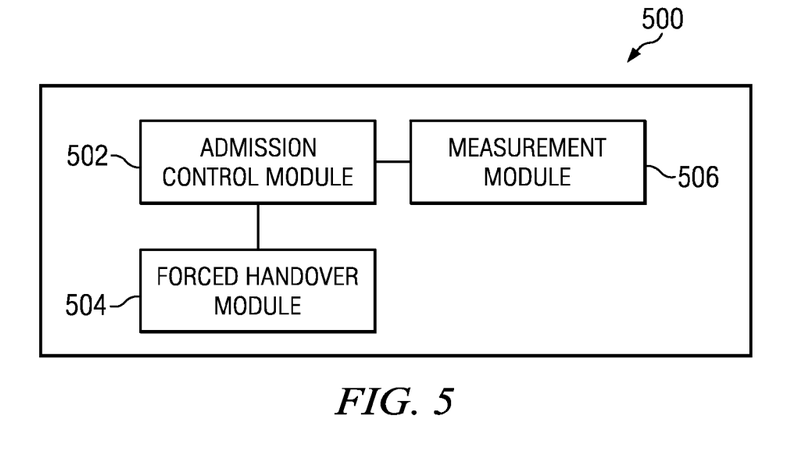
FIG. 5 illustrates an example apparatus for a forced handover in accordance with an example embodiment of the invention.

FIG. 5 illustrates an example apparatus 500 for forced handover in accordance with an example embodiment of the invention. The apparatus 500 includes an admission control module 502, a forced handover module 504, and a measurement module 506. In one example embodiment, the admission control module 502 may be configured to decide on a suitable layer to admit a mobile station based on measurements such as a QoS profile of the mobile station, a signal strength indicator (SSI), a signal to interference plus noise ratio (SINR) and the like, and cause the mobile station to connect to the suitable layer prior to the forced handover procedure. The measurement module 506 may be configured to collect measurements from each of a plurality of mobile stations in a serving layer upon deciding that the serving layer is overloaded.

In one example embodiment, the forced handover module 504 is configured to collect a plurality of loading measurements from at least the serving layer and an under-loaded layer, the loading measurements including at least current traffic loads, QoS profiles of the plurality of mobile stations and available resources of the serving layer. The forced handover module 504 may be further configured to compute an overall loading condition based at least on the collected loading measurements and decide whether the serving layer is overloaded and whether a forced handover is initiated. The forced handover module 504 may be configured to compute a cost function for each mobile station based on a set of collected measurements and select at least one mobile station from the plurality of the mobile stations in the serving layer based on the cost function values. The handover module 504 may also be configured to initiate the forced handover from the serving layer to the under-loaded layer via a signaling message to the selected mobile station.

In one example embodiment, the apparatus 500 may be part of the base station 110 of FIG. 1 or a network management node. FIG. 5 illustrates one example of an admission and forced handover apparatus, and various changes may be made to the apparatus 500 without departing from the principles of the invention.

FIG. 6 illustrates an example wireless apparatus in accordance with an example embodiment of the invention. The wireless apparatus 600 may include a processor 615, a memory 614 coupled to the processor 615, and a suitable transceiver 613 (having a transmitter (TX) and a receiver (RX)) coupled to the processor 615 and an antenna unit 618. The memory 614 may store programs such as an admission control & forced handover module 612. The wireless apparatus 600 may be at least part of a generic $4^{th}$ generation base station, an access point or an LTE compliant base station.

The processor 615 or some other form of generic central processing unit (CPU) or special-purpose processor such as digital signal processor (DSP), may operate to control the various components of the wireless apparatus 600 in accordance with embedded software or firmware stored in memory 614 or stored in memory contained within the processor 615 itself. In addition to the embedded software or firmware, the processor 615 may execute other applications or application modules stored in the memory 614 or made available via wireless network communications. The application software may comprise a compiled set of machine-readable instructions that configures the processor 615 to provide the desired functionality, or the application software may be high-level software instructions to be processed by an interpreter or compiler to indirectly configure the processor 615.

The admission control & forced handover module 612 may be configured to collect measurements from each of a plurality of mobile stations in a serving layer upon deciding that the serving layer is overloaded and compute a cost function for each of the mobile stations based on the collected measurements. The admission control & forced handover module 612 may also be configured to select at least one mobile station from the plurality of the mobile station in the serving layer based on the cost function for a forced handover from the serving layer to an under-loaded layer and initiate the forced handover from the serving layer to the under-loaded layer via a signaling message to the selected at least one mobile station. In an example embodiment, the admission control & forced handover module 612 may be configured to decide on a suitable layer to admit a roaming mobile station based on measurements such as a QoS profile of the mobile station, a signal strength indicator (SSI) and a signal to interference plus noise ratio (SINR) and cause the mobile station to connect to the suitable layer prior to the forced handover procedure.

In one example embodiment, the transceiver 613 is for bidirectional wireless communications with another wireless device. The transceiver 613 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 613, portions of the antenna unit 618, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 618 may be provided to convert between wireless signals and electrical signals, enabling the wireless apparatus 600 to send and receive information from a cellular network or some other available wireless communications network or from a peer wireless device. In an embodiment, the antenna unit 618 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 618 may include antenna tuning and/or impedance matching components, RF power amplifiers, and/or low noise amplifiers.

In general, the various exemplary embodiments of the wireless apparatus 600 may include, but are not limited to, part of a base station, part of network management system, or a wireless device such as a portable computer having wireless communication capabilities, Internet appliances permitting wireless Internet access and browsing, as well as portable units or terminals that incorporate combinations of such functions. In one embodiment, the wireless apparatus 600 may be implemented in the base station 110 of FIG. 1.

Without in any way limiting the scope, interpretation, or application of the claims appearing below, a technical effect of one or more of the example embodiments disclosed herein is easy implementation of a method for forced handover to efficiently distribute users across layers based on a cost function evaluation. Another technical effect is efficient use of resource across multiple layers of a wireless system.

Embodiments of the present invention may be implemented in software, hardware, application logic or a combination of software, hardware and application logic. The software, application logic and/or hardware may reside on a base station, a network management node or an access point. If desired, part of the software, application logic and/or hardware may reside on access point, part of the software, application logic and/or hardware may reside on a network element such as a base station or an access point. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising
collecting measurements from each of a plurality of mobile stations in a serving layer upon deciding that the serving layer is overloaded;
computing a cost function for each of the mobile stations based on the collected measurements, wherein the computing of the cost function comprises computing an overall cost C for each mobile station;
selecting at least one mobile station from the plurality of the mobile stations in the serving layer based on the cost function for a forced handover from the serving layer to an under-loaded layer; and
initiating the forced handover from the serving layer to the under-loaded layer via a signaling message to the selected at least one mobile station.

2. The method of claim 1 wherein deciding the serving layer is overloaded comprises at least:
collecting a plurality of loading measurements from at least the serving layer and one or more neighbor layers, the loading measurements including at least current traffic loads, quality of service (QoS) profiles of the plurality of mobile stations at the serving layer, and available resources of the serving layer; and
computing an overall system load based at least in part on the collected loading measurements.

3. The method of claim 2 wherein collecting measurements further comprises collecting technology-specific measurements or standard-specific measurements that comprises one of long term evolution (LTE)-specific measurements and Worldwide Interoperability for Microwave Access (WiMAX)-specific measurements.

4. The method of claim 2 wherein deciding whether the serving layer is overloaded is based on a predetermined schedule, on demand or a triggering event that includes an admission of a roaming mobile station into the serving layer.

5. The method of claim 1, wherein the overall cost $$C = \sum_{i=1}^{n} w_i \cdot f_i(M_i),$$

$w_1 \ldots w_n$ are weights for measurements $M_1 \ldots M_n$, the function $f_i(\ )$ is a normalization function that maps the measurement $M_i$ into a value between 0 and 1, and n is a total number of mobile stations in the serving layer.

6. The method of claim 5 wherein the weights $w_1 \ldots w_n$ are either dynamically adjustable and vary from −1 to 1 or predetermined based at least in part on operator policies.

7. The method of claim 5 wherein selecting the at least one mobile station for the forced handover comprises selecting at least one mobile stations with a highest cost function.

8. The method of claim 7 wherein the forced handover of the mobile station is a handover from an inner layer to an outer layer or from the outer layer to the inner layer.

9. The method of claim 1 further comprising causing the mobile station to connect to the serving layer prior to the forced handover based at least on one of a QoS profile of the mobile station, a signal strength indicator (SSI) and a signal to interference plus noise ratio (SINR).

10. An apparatus, comprising:
a measurement module configured to
collect measurements from each of a plurality of mobile stations in a serving layer upon deciding that the serving layer is overloaded; and
a forced handover module configured to
compute a cost function for the mobile station based on the collected measurements, wherein the computing of the cost function comprises computing an overall cost C for each mobile station;
select a mobile station from the plurality of the mobile station in the serving cell based on a cost function for a forced handover from the serving layer to an under-loaded layer; and
initiate the forced handover from the serving layer to the under-loaded layer via a signaling message to the selected mobile station.

11. The apparatus of claim 10, further comprising an admission control module configured to cause a roaming mobile station to connect to the serving layer prior to collecting the measurements based at least in part on one of a QoS profile of the mobile station, a receiving signal strength indicator (SSI) and a signal to interference plus noise ratio (SINR).

12. The apparatus of claim 11, wherein the measurement module is further configured to decide whether the serving layer is overloaded via at least:
collecting a plurality of loading measurements from at least the serving layer and the under-loaded layer, the loading measurements including at least current traffic loads, QoS profiles of the plurality of mobile stations and available resources of the serving layer; and
computing an overall loading condition based at least in part on the collected loading measurements.

13. The apparatus of claim 12, wherein the overall cost $$C = \sum_{i=1}^{n} w_i \cdot f_i(M_i)$$

and $w_1 \ldots w_n$ are weights for measurements $M_1 \ldots M_n$ and function $f_i(\ )$ is a normalization function that maps the measurement $M_i$ into a value between 0 and 1.

14. The apparatus of claim 11, wherein one of the serving layer and the under-loaded layer is an overlapped coverage area of a same frequency spectrum.

15. The apparatus of claim 11, wherein one of the serving layer and the under-loaded layer is an overlapped coverage area of different frequency spectrums and wherein the different frequency spectrums represent different network technologies.

16. The apparatus of claim 11 wherein the serving layer comprises a plurality of sectors with a shared frequency spectrum and a system-wide bandwidth shared among the plurality of sectors.

17. The apparatus of claim 11 wherein the serving layer comprises a plurality of sectors with a shared frequency spectrum and a system-wide bandwidth divided among the plurality of sectors.

18. An apparatus, comprising:
at least one processor; and
at least one memory including computer program code
the at least one memory and the computer program code configured to, with the at least one processor, cause the apparatus to perform at least the following:
collecting measurements from each of a plurality of mobile stations in a serving layer upon deciding that the serving layer is overloaded;
computing a cost function for each of the mobile stations based on the collected measurements, wherein the computing of the cost function comprises computing an overall cost C for each mobile station;
selecting at least one mobile station from the plurality of the mobile station in the serving layer based on the cost function for a forced handover from the serving layer to an under-loaded layer; and
initiating the forced handover from the serving layer to the under-loaded layer via a signaling message to the selected at least one mobile station.

19. The apparatus of claim 18 wherein the at least one memory and the computer program code configured to, with the at least one processor, cause the apparatus to further perform:
causing a roaming mobile station to connect to the serving layer prior to collecting the measurements based at least in part on one of a QoS profile of the mobile station, a receiving signal strength indicator (SSI) and a signal to interference plus noise ratio (SINR).

20. The apparatus of claim 18 wherein deciding whether the serving layer is overloaded further comprises at least:
collecting a plurality of loading measurements from at least the serving layer and
one or more neighbor layers, the loading measurements including at least current traffic loads, quality of service (QoS) profiles of the plurality of mobile stations at the serving layer, and available resources of the serving layer; and
computing an overall system load based at least in part on the collected loading measurements.

* * * * *